United States Patent
Cisneros

(10) Patent No.: US 7,507,869 B2
(45) Date of Patent: Mar. 24, 2009

(54) METHOD FOR EXTRACTING OIL FROM PLANT MATERIAL

(76) Inventor: Ignacio Cisneros, 1112 W. 22nd St., Odessa, TX (US) 79763

( * ) Notice: Subject to any disclaimer, the term of this patent is extended or adjusted under 35 U.S.C. 154(b) by 0 days.

(21) Appl. No.: 12/006,409

(22) Filed: Jan. 2, 2008

(65) Prior Publication Data

US 2008/0107591 A1    May 8, 2008

Related U.S. Application Data

(62) Division of application No. 10/921,930, filed on Aug. 20, 2004, now Pat. No. 7,326,822, which is a division of application No. 09/923,535, filed on Aug. 8, 2001, now Pat. No. 6,808,621.

(51) Int. Cl.
    *A23L 1/28* (2006.01)
(52) U.S. Cl. ............... 585/833; 585/853; 585/868; 426/489; 208/311
(58) Field of Classification Search ............. 208/311; 585/833, 868
    See application file for complete search history.

(56) References Cited

U.S. PATENT DOCUMENTS

| 5,308,553 | A  | * | 5/1994  | Cisneros | 252/601 |
| 6,808,621 | B1 | * | 10/2004 | Cisneros | 208/133 |
| 7,326,822 | B1 | * | 2/2008  | Cisneros | 585/854 |

* cited by examiner

*Primary Examiner*—Tam M Nguyen
(74) *Attorney, Agent, or Firm*—Lawrence E Laubscher, Sr.; Lawrence E Laubscher, Jr.

(57) ABSTRACT

Metal hydride compounds, which are prepared by mixing together from about 1 to about 10 parts by molecular weight of at least one metal selected from the group consisting of silicon, aluminum, tin, and zinc; from about 1 to about 3 parts by molecular weight of an alkali metal hydroxide; and from about 5 to about 10 parts by molecular weight of water and allowing this mixture to stand for a time sufficient to form a metal hydride, can be used for making fuel additives, treating sour gas, enhancing oil refining, extracting oil from tar sands and shale, increasing production of hydrogen from a hydrogen plant, treating oil and gas wells to enhance production, eliminate PCBs, cleaning soil contaminated by hydrocarbons and/or heavy metals, controlling odors, cleaning polluting stack emissions, extracting edible and essential oils, and eliminating bacteria, fungicides, and parasites from vegetation.

2 Claims, No Drawings

METHOD FOR EXTRACTING OIL FROM PLANT MATERIAL

CROSS-REFERENCE TO RELATED APPLICATIONS

This application is a division of application Ser. No. 10/921,930 filed Aug. 20, 2004, now U.S. Pat. No. 7,326,822, which in turn is a division of parent application Ser. No. 09/923,535 filed Aug. 8, 2001, now U.S. Pat. No. 6,808,621 issued Oct. 26, 2004.

FIELD OF THE INVENTION

The present invention is directed to a method and catalyst compounds for treating hydrocarbons, including petroleum, sour gas, as well as for extracting petroleum products from tar sands and shale and for enhancing production from conventional oil and gas wells. The compounds of the present invention can also be used to clean soil contaminated by heavy metals and/or hydrocarbons, as well to clean as polluting stack emissions. The compounds of the present invention can be used in extracting oil from plants, for eliminating bacteria, fungi, and parasites from vegetation, as well as for odor control.

BACKGROUND OF THE INVENTION

Cisneros, in U.S. Pat. No. 5,308,553, the entire contents of which are hereby incorporated by reference, discloses metal hydride compounds comprising a mixture of at least one metal selected from the group consisting of silicon, aluminum, tin, and zinc; an alkali metal hydroxide; and water. These compounds have heretofore been used for separating coal fines from coal fine waste slurries, cleaning and desludging hydrocarbon storage tanks, providing fire-retardant properties to composite materials, and protecting metal parts from corrosion.

Crude oil can be easily separated into its principal products, i.e. gasoline, distillate fuels, and residual fuels, by simple distillation. However, neither the amounts nor quality of these natural products matches demand. The refining industry has devoted considerable research and engineering effort as well as financial resources to convert naturally occurring molecules into acceptable fuels. There is a real need to meet the tremendous demand for gasoline without overproducing other petroleum products for which there is less demand. As the price of crude oil increases, it is even more critical to be able to produce the highest value products from the crude oil.

Catalytic cracking is the primary refinery process for changing the molecular structure of the crude oil. The principal class of reactions in the fluidized bed catalytic cracking process, the one most commonly used, converts high boiling, low octane normal paraffins to lower boiling, higher octane olefins, naphthenes (cycloparaffins), and aromatics. However, naphtha converted by fluidized bed catalytic cracking may contain unacceptably high amounts of foul smelling mercaptans, and its thermal stability may be too low for it to be economically useful.

Catalytic reforming can also be used to increase the octane of gasoline components. The feed is usually naphtha boiling in the 80-210° C. range, and the catalysts used are platinum on alumina, normally with small amounts of other metals such as rhenium. Depending upon the catalysts and operating conditions, the following types of reactions occur to a greater or lesser extent:

1. Heavy paraffins lose hydrogen and form aromatic rings;
2. Cycloparaffins lose hydrogen to form corresponding aromatics;
3. Straight-chain paraffins rearrange to form isomers and
4. Heavy paraffins are hydrocracked to form lighter paraffins.

Reforming generates highly aromatic, high octane product streams and much hydrogen. The hydrogen, which can be used to improve the quality of many other refiner streams, is an extremely valuable product of reforming. However, reforming also produces benzene, polynuclear or multiring aromatics, and light gas (one to four carbon atoms). Benzene is a recognized carcinogen and its concentration in gasoline is regulated in the United States. Polynuclear aromatics can contribute to deposits in the combustion chamber of automobiles; these compounds can be removed by distilling the entire reformate and discarding the heaviest fractions.

Hydroprocessing or hydrotreatment to remove undesirable components from hydrocarbon feed streams catalytically is well know to increase the commercial value of heavy hydrocarbons. However, "heavy" hydrocarbons liquid streams, and particularly reduced crude oils, petroleum residua, tar, sand bitumen, shale oil or liquid coal or reclaimed oil, generally contain contaminants such as sulfur and/or nitrogen which deactivate catalyst particles during contact by the feed stream and hydrogen under hydroprocessing conditions. Hydroprocessing conditions are normally in the range of 212° F. to 1200° F. at pressures of from 20 to 300 atmospheres.

Since 1990, the Clean Air Act Amendment has mandated reformulation of gasoline and diesel fuel to achieve specific reductions in emissions of volatile organic compounds, toxic compounds, and carbon monoxide without increasing emissions of nitrogen oxides. Gasoline must be reformulated to have lower vapor pressure and benzene content, as well as lower total aromatics of about less than 25%, depending upon the benzene content. There are also baselines for olefins, sulfur, and 90% distillation point. Diesel fuel specifications were changed to specify a maximum of 0.05% sulfur and a minimum cetane index of 40, or a maximum aromatics content of 35% vol for on-road diesel. For off-road diesel, higher sulfur concentrations are permitted.

MTBE, methyl tertiary butyl ether, is the most widely used ingredient in reformulated gasoline. In 1999 the United States produced 4.5 billion gallons of MTBE. A gallon of gasoline contains 10% MBTE. Unfortunately, MTBE does not break down easily, and is more soluble in water than any other ingredient in gasoline. MTBE, even at low levels, gives water a turpentine odor and taste, and is now considered to be a possible carcinogen. MTBE has been found contaminating ground and surface water in all fifty states. The cost to clean up just one city in Southern California has been estimated at $100,000,000.00. The federal government has declared that MTBE will be banned by 2003 because of environmental problems and possible risks to humans.

There is a real need for a method for producing gasoline and diesel fuels that will reduce harmful emissions and retain fuel economy.

Additionally, changes in market conditions and plant operating economics require examination of traditional processes and operating procedures for petroleum products and natural gas treating applications for upgrading to more stringent standards of efficiency in order to remain competitive, while returning a satisfactory operating profit margin to the company.

A typical petroleum refinery has acid gas treating requirements for several streams, including at least one of the following:

Recovered gas to fuel produced as crude oil feed is upgraded to lighter liquid products
Ethylene concentrate prepared for feedstock
Gasoline concentrate prepared for petrochemical feedstock
Liquid LPG streams (i.e., propane, ethane, butane, etc.)

Recycle hydrogen and hydrogen desulfurizing processes
Hydrogen production for hydrocracking
Sulfur recovery unit tail gas treating
Sour water treating.

Unfortunately, the requirements for treating the above streams vary considerably. While specific solvents might be chosen for optimum treatment of each stream, in order to minimize cost, the typical refinery usually treats several streams with one solvent.

The choice of solvent may be based on individual expenses, trouble-free performance, treated product specifications, or the expectation that the overall performance will be favorable, there being more positive benefits in one solvent than liabilities. Monoethanolamine (MEA) and diethanolamine (DEA) are the more traditional solvents used in typical refinery main system acid gas removal processes.

MEA has a number of advantages as a solvent for use in refineries, including a capability of producing the lowest levels of hydrogen sulfide and carbon dioxide in the product. MEA can be partially reclaimed in the event of thermal degradation or buildup of heat stable salts. Moreover, MEA can hydrolyze carbonyl sulfide for removal. Unfortunately, MEA has high heats of reaction with hydrogen sulfide and carbon dioxide. MEA lacks selectivity, and for applications where this is a preference, energy requirements are further increased. MEA is appreciably soluble in liquid hydrocarbon streams. The potential for corrosion limits solution strength to about 15 percent. Moreover, a portion of the carbonyl sulfide and carbon dioxide removed reacts irreversibly with the MEA.

DEA can be used as a replacement for MEA. DEA has the advantage of lower heats of reaction with hydrogen sulfide and carbon dioxide, and a slight selectivity for hydrogen sulfide over carbon dioxide. DEA is six to eight times less soluble than MEA in liquid hydrocarbons, and can remove carbonyl sulfide in some cases to acceptable levels. However, DEA has insufficient selectivity for tail gas treating. Reclaiming DEA is not an easy, straightforward process, and DEA forms irreversible products with carbon dioxide. DEA does not produce treated gas specifications as low as does MEA, and the corrosion potential of DEA limits the solution strength to about 30 percent.

Polychlorinated biphenyls, or PCBs, are a family of manmade compounds having two six-membered aromatic rings with varying degrees of chlorination on the rings that comprise over 200 individual compounds which have varying degrees of toxicity and which have different physical and chemical characteristics. PCBs have been widely used in industry since the beginning of the twentieth century. PCBs exist mainly in either a liquid state or a solid state. In the liquid state, PCBs are oily liquids which are light yellow. In the solid state, PCBs are white powder.

Unfortunately, many of the characteristics which make PCBs ideal for use in industry are the characteristics which are responsible for their toxic effect on the environment. Specifically, their thermal stability, inertness, low water solubility, and low electrical conductance, made PCBs the perfect choice for use in flame retardants, electrical insulators, lubricants, and liquid seals. However, the non-reactivity and stability of the PCBs means that they accumulate in the environment and are difficult to break down.

Because of evidence that PCBs accumulate in the environment and may cause health hazards for humans and other animals, the manufacture of PCBs has been banned since 1977. Among the adverse health effects are liver damage, skin irritations, reproductive and development effects, and cancer.

There are currently four standard treatment/disposal procedures for PCBs: incineration, low temperature desorption and subsequent disposal of hazardous PCBs, biotreatment, and long term specialized storage. While each of these procedures is somewhat effective, none is free from objections and criticism. Therefore, both industry and environmental regulators are seeking new technologies to use in place of the standard procedures.

Sludges or tank bottoms are a mixture of hydrocarbons, mixed or contaminated with water and sediment. Sludges are found in different areas of the oil industry, such as in storage tanks in refineries and in production fields. Some countries have open pits where crude has been stored over the years because oil production outpaced refinery capabilities.

Ocean going tankers provide another supply of tank bottoms that must be cleaned prior to receiving new shipments of crude, or before carrying finished products. The treatment of tank bottoms may vary, but there are currently three basic methods:

(1) Mechanical methods use robots or personnel to operate equipment inside of the tank to remove both asphaltic and paraffinic bottoms. Excessive project costs are realized with mechanical methods because of the amount of time it takes to complete the cleaning, dispose of the removed product, hazardous working conditions, and increased probability of equipment damage and failure.

(2) Thermal methods are best used for tank bottoms in which the concentration of paraffins is relatively high. These methods consists of steaming, hot oiling, and attaching heaters to the tanks. Increasing the heat within the tank will melt the paraffin and temporarily convert it into a liquid. Solidification will reoccur once temperatures are lowered. At such time the paraffins are often more difficult to remove because the light end hydrocarbons have been removed. Heat only temporarily changes the paraffinic state. The desired transferable liquid state will not be maintained once the heat source is removed. It is costly to retain the heat, and there is also some residue that remains that must be cleaned by mechanical means.

(3) Chemical methods offer many advantages that are efficient, economical, and environmentally appearing. A chemical tank bottom treatment breaks up and removes the sludges while reclaiming the hydrocarbon content. This method is often less expensive when the commercially valuable hydrocarbons are converted from solid deposits into salable product to be sent to the refinery, rather than merely disposing of them by an approved method.

Materials and parts degreasing is an integral part of many industrial processes, including the manufacturing of automobiles, electronics, furniture, appliances, jewelry, and plumbing fixtures. Degreasing is also frequently used in the textile, paper, plastics, and glass manufacturing industries. It is most often used as a surface preparation process to remove contaminants and prepare raw materials and parts for subsequent operations like machining, painting, electroplating, inspection, and packaging.

The conventional manner of degreasing these parts or materials is to use solvents and mixtures of solvents, which are generally halogenated and nonhalogenated organic chemicals. Although these compounds are effective at degreasing, most are carcinogenic, according to the EPA. These chemicals create other health threats as well, including depletion of the ozone layer. Because the Environmental Protection Agency has deemed these chemicals to be hazardous, it is important to find a substitute that is environmentally safe.

Another type of hard surface cleaning is that used in food processing manufacturing lines, such as plants where meat is cooked and processed, or where nuts are shelled, roasted, and packaged. Solvent cleaning, acid cleaning, or harsh alkaline cleaning products are often used to remove oily residue from these processes.

A third type of hard surface cleaning is for cleaning industrial equipment, or any freight-carrying vehicle. Again, solvents, acids, or harsh alkaline products are used to remove dirt and grime, oily residue, and odors.

SUMMARY OF THE INVENTION

It is an object of the present invention to overcome the aforesaid deficiencies in the prior art.

It is another object of the present invention to provide a compound that can be used to reform, isomerize, and polymerize hydrocarbons to produce improved fuels.

It is a further object of the present invention to provide improved fuels for internal combustion and diesel engines.

It is another object of the present invention to treat sour gas.

It is a further object of the present invention to improve the efficiency of oil refining.

It is still another object of the present invention to provide a method for extracting oil from tar sands.

It is another object of the present invention to provide a method for extracting oil from shale.

It is yet another object of the present invention to provide a method for increasing the production of hydrogen from a hydrogen plant.

It is a further object of the present invention to provide an improved method for treating oil and gas wells to enhance production.

It is another object of the present invention to reduce drag in pipelines carrying oil and fuels.

It is a further object of the present invention to eliminate PCBs.

It is still another object of the present invention to provide a process for cleaning soil contaminated with hydrocarbons.

It is yet another object of the present invention to provide a process for cleaning soil contaminated with heavy metals.

Its another object of the present invention to control odors in industrial installations.

It is a further object of the present invention to clean polluting stack emissions from industrial plants.

It is another object of the present invention to extract vegetable oil from plant materials.

It is a further object of the present invention to provide a composition and method for eliminating bacteria, fungi, and parasites from vegetation.

According to the present invention, metal hydride compounds such as disclosed and claimed in Cisneros, U.S. Pat. No. 5,308,553, are used for all of the purposes described above. In general, these compounds comprise about 1-10 parts by molecular weight of at least one metal selected from the group consisting of silicon, aluminum, tin, and zinc; from about 1 to about 3 parts by molecular weight of an alkali metal hydroxide; and from about 5 to about 10 parts by molecular weight of water. These compounds are prepared by adding alkali metal hydroxide to the at least one metal, followed by adding water thereto. The mixtures are preferably allowed to stand for a period of time from about 6 to about 8 hours before use. These metal hydride compounds can be used in a variety of applications as described herein.

For purposes of the present invention, these compounds will also be referred to as electromechanical catalysts, or proton donors.

The electro mechanical catalysts of the present invention are stable, environmentally safe compounds based primarily on silicon and hydrogen. Unlike their nearest relative compound, sodium silicate, which is an inorganic monomer, the electromechanical catalysts of the present invention are polymeric compounds, which makes it possible to add other chemicals to them for special applications. They are characterized as bases with a high pH, on the order of sodium hydroxide, but without the harmful and hazardous characteristics associated with sodium hydroxide. The electromechanical catalysts of the present invention have electrical and behavioral properties that allow them to take on either positive or negative changes by altering the structure of metals, allowing a distinct separation between the positive and negative poles.

The compounds of the present invention are water soluble, non-flammable, and non-explosive. In the normal ready to use state, they are non-toxic and non-corrosive. The shelf life of these compounds is extended, and decomposition occurs only at temperatures in excess of 1500° C. If decomposition occurs, the compounds are converted to silicon dioxide and water.

Of the electromechanical catalysts that can be used in the present invention, the preferred compound has the molecular formula $Na_{8.2}Si_{4.4}H_{9.7}O_{17.6}$, and will also be referred to hereinafter as MSS-58.

MSS-58 when added to water acts as a wetting agent, causing water to penetrate more easily into, or spread over the surface of another material, by reducing surface tension of the water. MSS-58 is also a surface active agent, as it reduces the interfacial tension between two liquids, or between a liquid and a solid. In practical applications, as a surface active agent, MSS-58 will reduce the interfacial tension between water, oil, and sand. MSS-58 is also an effective water softener, eliminating the hardening ions, calcium ion and magnesium ion from solution.

MSS-58 liberates microscopic particles of salts and other sediments commonly encountered in industrial processes, so that MSS-58 can help in separating various elements and/or sediments by specific gravity, resulting in very clearly defined layers of material.

MSS-58 protects metals from corrosion by coating the metal, thus preventing degradation of metals by chemicals and/or the atmosphere. The corrosion inhibition characteristics can be enhanced considerably by the addition of other chemicals, depending upon the specific metals to be protected and the conditions to which the metals are exposed.

As a strongly alkaline compound, MSS-58 neutralizes common industrial acids, including sulfuric and hydrochloric acids. However, unlike conventional acid neutralizers, MSS-58 is not harmful or hazardous.

MSS-58 has been found to be particularly useful in reforming, isomerizing, and polymerizing hydrocarbons to produce improved fuels for vehicles. By introducing MSS-58 into a hydrocarbon distillation system, the compound creates hydrogen cracking and reforming without the requirement for additional heat and pressure. The catalyst of the present invention is mixed at different ratios with the crude oil prior to being fed to the distillation unit. The ratios depend on the type of crude oil being treated. The presence of $Na_{8.2}Si_{4.4}H_{9.7}O_{17.6}$ in the distillation prevents formation of olefins, aromatic solvents, and alkynes under heated conditions, and also prevents low boiling point hydrocarbons from being converted to gases.

Improved fuels prepared according to the present invention are referred to in this application as Permian super fuel, or PSF. PSF is a hydrocarbon fuel which runs in normal vehicles with a large increase in fuel economy and engine performance. PSF is not water soluble, does not oxidize, and evaporates to a much lower degree than conventional gasoline. PSF burns 83% cleaner then conventional gasoline and uses one third less clean air from the atmosphere for combustion. PSF does not have the same temperature-pressure relationships as conventional fuels. PSF has an internal molecular lubricant which is highly combustible.

PSF is produced from raw fuel as a base, restructured, with no need for other blended additives. The PSF actually changes the structure of the fuel, including changing the gravity and density of the fuel. PSF fuel has lubricity unlike gasoline. It is thus possible to develop lubricity standards for PSF fuel if none exist for gasoline.

DETAILED DESCRIPTION OF THE INVENTION

The compounds of the present invention, are metal hydride compounds which have an abundance of excess hydrogen with a neutral-monatomic cation positive charge within the structure. In order to release these excess hydrogen atoms, the stable structure of the compound, also known as a solutizer-promoter, must be put into a certain chemical environment. Silicon, another important component of the solutizer-promoter, appears to have a neutral polar charge with a strong tendency to form negative, monatomic anions.

The preferred compound is $Na_{8.2}Si_{4.4}H_{9.7}O_{17.6}$, which is a clear, slightly yellow liquid with only a slight odor. It is miscible in water, and has a pH of about 12.95 to about 13.35. Its vapor pressure at 100° F. is less than 0.1, and it freezes at 32° F. It has a specific gravity of 1.25.

Hydrocarbon structures appear to be the most affected by the compounds of the present invention. It appears that the polar kinetic charge of these solutizer/promoters inhibit hydrogen placement and structure formation in hydrocarbons while displacing sulfur.

Fuel Improvement

To produce improved gasoline, diesel fuel, fuel oil, kerosene and jet fuel, the following process is used:

1. Turn on a heater to feed a heat exchanger inside a reactor vessel. Heated fluid, e.g., a glycol such as propylene glycol, is circulated through the system to maintain the temperature at about 150-175° F.

2. The hydrocarbon to be improved, e.g., gasoline, diesel fuel, fuel oil, kerosene, or jet fuel, is introduced into the reactor.

3. A hydrohalic acid, such as hydrochloric or hydrobromic acid, is introduced into the reactor.

4. A metal oxide, e.g., chromic oxide, nickel oxide, chromium oxide, aluminum oxide, magnesium oxide, or manganese oxide, is introduced into the reactor.

5. $Na_{8.2}Si_{4.4}H_{9.7}O_{17.6}$ is introduced into the reactor.

6. A pump is activated, and all ingredients are circulated within the reactor vessel in a totally enclosed system for approximately two hours at a temperature of less than 175° C. The pressure used for the entire process is less than about 100 psi.

After the reaction is completed, the PSF is run through a fine screen filter (about 300-about 400 mesh) to remove any impurities.

While the reaction can be conducted at room temperature, it has been found that controlled heat or pressure makes the reaction proceed more rapidly than when conducted at ambient conditions. The preferred temperatures range from about 50-150° F., but temperatures up to about 175° F. can be used. The reaction is preferably conducted at pressures from about ambient pressure to less than about 100 psi, and can be conducted preferably at approximately 25 psi.

To produce the PSF of the present invention, the ingredients are used in approximately the following amounts by weight:

fuel, 85 to 96% (any octane can be used)
acid, 1 to 5%
metal oxide, 0.1 to 1%
$Na_{8.2}Si_{4.4}H_{9.7}O_{17.6}$, to 5%

$Na_{8.2}Si_{4.4}H_{9.7}O_{17.6}$ and its related electrochemical catalysts can also be used in alkylation and cracking of hydrocarbons as well as in hydrocarbon reforming. A mixture of hydrochloric acid, magnesium aluminum silicate, and an electromechanical catalyst such as $Na_{8.2}Si_{4.4}H_{9.7}O_{17.6}$ can be used both to reform and to desulfurize hydrocarbons. By using the solutizer/promoter of the present invention, less pressure and heat is needed than in conventional reforming and desulfurizing processes, which prevents formation of unwanted hydrocarbons.

$Na_{8.2}Si_{4.4}H_{9.7}O_{17.6}$ and related electromechanical catalysts can also be used in thermal cracking of hydrocarbons, again with less heat and pressure than is required for conventional processes. For thermal cracking, the electromechanical catalyst is introduced to the hydrocarbons to be cracked prior to injection into the reactor.

All processes involving reacting an electromechanical catalyst with hydrocarbons can be conducted in conventional reactors with little or no structural changes to the reactor.

PSF is a higher octane fuel than conventional gasolines, which produces higher performance and higher engine lubrication than conventional fuels. PSF is a friction reducer (a lubricant), and needs less oxygen for combustion than conventional fuels. PSF is a cleaner burning fuel than conventional fuels, reducing emissions. Moreover, PSF is very inexpensive to produce and yields a considerable savings in fuel refining production carbonyl sulfides.

PSF changes the hydrocarbon structure of fuels, producing a high octane fuel with a flammable drag reducer. PSF has reduced or no dodecanes, sulfur, nitrate, or other poor quality compounds in the fuel. Its volatility is constant, so there is no need for seasonal additives. The compounds of the present invention act as a metal deactivator and rust inhibitor.

Fuels produced using electromechanical catalysts such as $Na_{8.2}Si_{4.4}H_{9.7}O_{17.6}$ have increased octane as compared with conventional fuels, and are environmentally safe. Because PSF burns at lower temperatures than conventional fuels, it minimizes knocking and burns cleanly. MSS-58 and related compounds added to fuels add hydrogen and at the same time release and reduce sulfurs and nitrates. Normal fuel molecular mass is greatly affected, so that the fuel is converted to a more flammable, cleaner burning fuel. PSF reformulated fuels process can be used for gasoline, diesel, kerosene, and jet fuels. PSF reduces harmful emissions, increases fuel economy, and is cost effective. PSF can be used easily in all current refining processes, including isomerization, polymerization, hydrogenation, and hydrocracking without costly retrofitting expenses to the refinery.

The PSF fuels according to the present invention are higher octane, high performance fuels which also lubricate engines. The PSF fuels need less oxygen than conventional fuels and inhibit oxidation of the engine. PSF fuels are cleaner burning, and thus reduce air emissions. It is relatively inexpensive to produce PSF fuels, leading to a considerable savings in fuel refining production cost.

PSF is also a lubricant. By using compounds of the present invention as the catalyst to restructure fuels, structures in the fuel called "cages" impart the lubricity to PSF. One possible mechanism, by which the present inventor does not wish to be bound, is that silicon compounds or other substances at concentrations too low to measure by presently available methods tend to shroud themselves with molecules native to the gasoline or diesel fuel. The surrounding molecules can be thought of as forming a "cage" around the central molecule. This assemblage can be thought of as a "cage" compound. This concept serves to explain the greater than expected lubricating properness of PSF while offering a reason for no other detectable changes in the fuel because the cage compound may shield the central molecule from some forms of detection.

PSF lubricity is believed to arise partly from the adsorption of certain fuel molecules onto metal surfaces. Interfering with that adsorption can limit lubricity. For example, adding a small concentration of some oxygenates such as MBTE can decrease fuel lubricity, apparently because the oxygenate has different intermolecular interactions or affinities from the bulk hydrocarbon liquid, and the oxygenate can attract back into solution the molecules that were adsorbed on the surface which provided lubricity. The compounds used as catalysts to make PSF act in the opposite way from an oxygenate. That is, unlike oxygenates, the compounds of the present invention make the bulk fuel less compatible with the types of molecules that are responsible for lubricity. This phenomenon may drive more of the lubricity-imparting molecules out of the bulk solution and onto the metal surfaces through adsorption.

PSF controls evaporation and vapor pressure. PSF is easy to handle, store, or transport.

PSF fuels are anti-knock fuels because of the lower combustion temperatures needed to burn the fuels clean, which virtually eliminates knocking and pinging. In PSF fuels, the amount of benzene is lowered to produce a more energy efficient, less polluting fuel. Olefins are reduced by reforming them to single bond branched compounds, which are more energy efficient. Concentrations of toluenes and xylenes are lowered as the PSF fuels are reformed to produce a more energy efficient cyclo-methyl structure. Carbon compounds are restructured to form Si—H molecules, which increases the energy and boiling point of the fuels. Pentanes and hexanes are increased and converted from straight chain molecules to eclipsed molecules, i.e., dimethyl or cyclomethyl compounds, which are more energy efficient. PSF fuels have less static drag. The mechanical and thermodynamic structure of PSF fuel makes a perfect fuel that is not affected by high temperature or by altitude changes. PSF is not affected by turbulent fluctuations. The density and viscosity of PSF remain constant.

Restructuring hydrocarbon molecules according to the present invention requires little or no heat or pressure. Controlled heat or pressure added to the process can be used to speed up the reaction. Adding the electromechanical catalyst of the present invention is similar to fuel refining processes, namely, hydrogenation, isomerization, and polymerization.

Hydrogenation is accomplished by weakening the magnetic polar charge so as to rearrange and add hydrogen to the molecules. During hydrogenation, sulfur, nitrogen, and oxygen are removed and drop out as sulfides and nitrates.

Isomerization is accomplished by changing the straight chain, double bond and aromatic structures and rearranging the molecules into eclipsed, isoparaffin, and methylcyclo molecules which have a higher BTU rating.

Polymerization is accomplished by polar electronegative effects that are silicon structures within the fuel. This is the most important reaction because it raises the boiling point, raises the percentage of hydrogen in the fuel, lowers combustion temperature, lubricates fuel internally, and greatly affects the vapor pressure because the product fuel is more dense.

The electromechanical catalysts of the present invention have an abundance of excess hydrogen with a neutral-monatomic cation positive charge within the structure. To release these hydrogen atoms, the stable structure of the compounds must be put into a certain chemical atmosphere. Silicon, another important element of these compounds, could be a new isotope with a neutral polar charge with a strong tendency to form negative, monatomic ions, since the compounds are possible proton donors.

The electromechanical catalysts of the present invention appear to react on all elemental polar structures by slowing electron orbits or changing electron magnetic dipole forces. Hydrocarbon structures seem to be the most affected by these compounds.

Table 1 illustrates the differences between isomerization, polymerization, and hydrogenation and hydrocracking between conventional processes and the process of the present invention, termed the "PSF Procedure."

TABLE 1

Fuel Refining
Standard Method versus the Concorde PSF Procedure

| | | Standard Method | PSF Procedure |
|---|---|---|---|
| Isomerization | Products | Butane-Isobutane Isoparaffins with high octane rating | Butane-Isobutane Isoparaffins with high octane rating |
| | Catalyst | Aluminum chloride supported with ALO$_3$ | Oxide + Acid Base |
| | Promoter | Hydrogen Chloride Gas | Electromagnetic Catalyst |
| | Pressure Needed | 200 to 800 PSI | 25 PSI |
| | Temp. Needed | 455 to 535 deg. F. | 80 to 150 deg. F. |
| | Purifaction | Molecular sieve extraction | Platinum charcoal filter |
| | Distillation | Final Step | Not Needed |
| Polymerization | Catalyst | Nickel Platinum | Oxide + Acid Base |
| | Promoter | Hydrogen | Electromagnetic Catalyst |
| | Pressure Needed | 400 to 1200 PSI | 25 PSI |
| | Temp. Needed | 350 to 450 deg. F. | 80 to 150 deg. F. |
| Hydrogenation and Hydrocracking | Catalyst | Nickel, Platinum (cracking-alumina-silica) | Oxide + Acid Base |
| | Promoter | Hydrogen | Electromagnetic Catalyst |
| | Pressure Needed | 1000 to 2000 | 25 PSI |
| | Temp. Needed | 500 to 800 deg. F. | 80 to 150 deg. F. |

In this case, "polymerization" length refers to increasing the chain of the hydrocarbon.

PSF reformulated fuels can be blended with regular gasoline, diesel, or kerosene at ratios ranging from about 10:1 to about 50:1. Field testing of PSF reformulated fuels exhibited an estimated fuel savings of from 20-40%.

Comparative Tests
Emissions

The test vehicle was a 1992 Chevrolet Blazer with a 4.3 liter V6 engine. The odometer reading was 156,265 miles. When regular unleaded gasoline was used as the fuel, and tested with an ESP Emission Inspector Analyzer FICS, Model No. 4000-T, the hydrocarbon emission with no additive at 809 rpm was 181 and the carbon monoxide emission with no addition was 0.49%. When the fuel used was PSF added in a 20:1 ratio to regular unleaded gasoline, using the same testing equipment, at 853 rpm, the hydrocarbon emission was 30, and the carbon monoxide was 0.03%. Thus, the PSF of the present invention reduced hydrocarbon emissions by 83% and carbon monoxide emissions by 96%.

Two-Cycle Engine Test

The vehicle used was a McCullogh two cycle model 1385L. The testing device was an ESP Emission Inspector analyzer with a maximum recordable limit of 9999 ppm. In the first test, regular unleaded gasoline was blended with regular two cycle oil at a 32:1 ratio. It required 25 seconds to reach the maximum recordable limit of 9999 ppm. The technician/operator estimated the emission to be about 16,000 to 18,000 ppm.

In a second test, regular unleaded gasoline was blended with PSF reformulated fuel at a 20:1 ratio. The motor ran for three minutes. The maximum recorded hydrocarbon emission was 1403 ppm.

Comparative Fuel Test Results

Regular unleaded gasoline with no additive was compared with gasoline with 5% PSF fuel additive.

The ingredients of the two fuels are shown in Table 2.

name only a few of the hydrocarbons removed by ethanolamine, lowers the octane levels in the polished gasoline product.

The most important characteristics for good gasoline are volatility, i.e., the gasoline's tendency to vaporize, because gasoline must be vaporized before it can burn in the combustion chamber of an engine. Also, the gasoline blend must maintain its stability and be as nearly constant a product as is possible.

In the following tests, the fuels are identified by the following:

| DESCRIPTION | MISC NUMBER |
| --- | --- |
| PSF FCC Reformulated Fuel | 274 |
| FCC Control Sample | 275 |
| PSF FCC in a 20:1 ratio gasoline:PSF | 276 |

Standard Test Method for Research Octane Number (RON) of Spark-Ignition Engine Fuel This test covers quantitative determination of the knock ratio of liquid spark-ignition engine fuel in terms of its

TABLE 2

Comparative Fuel Test Results
PSF (PERMIAN SUPER FUEL)
Fuel: Regular unleaded gasoline

| Ingredients | | Gasoline with no additive | | | Gasoline with PSF fuel additive | | |
| --- | --- | --- | --- | --- | --- | --- | --- |
| | | Mole | Liq Vol % | Weight % | Mole | Liq. Vol % | Weight % |
| Methycyclepentane | MCP | 2.1116 | 2.0581 | 1.8841 | MCP 4.7816 | 4.6904 | 4.2353 |
| Benzene | | 4.0187 | 3.9168 | 3.3280 | 1.1615 | 1.1393 | 0.9548 |
| Octane | | 5.6340 | 6.1602 | 6.8232 | 7.8126 | 8.5972 | 9.3925 |
| Vapor Pressure | 9.72 | | | | 16.73 | | |

Comparative Results

| Ingredient | Regular Gasoline | Gasohol | Gasoline with MTBE | Gasoline with PSF |
| --- | --- | --- | --- | --- |
| T90 (°F) | 332 | 316 | 318 | 316 |
| Aromatics (vol %) | 28.6 | 23.9 | 25.8 | 23.4 |
| Olefins (vol %) | 10.8 | 8.7 | 8.5 | 8.2 |
| Benzene (vol %) | 1.60 | 1.6 | 1.6 | 1.3 |
| Sulfur (PPM) | 338 | 305 | 313 | 302 |

Benefits of Processing heavy Crude Oil with MSS-58

In gasoline research, speciation is a powerful tool for understanding the combustion process and to observe the effects of varying gasoline and alternate fuel compositions. A number of tests were conducted to obtain information on Permian Super Fuel (PSF).

Refinery gasoline used in these tests is a fuel blend from a Fluid Catalytic Cracking unit (FCC). This particular sample blend of FCC gasoline, which was tested, was taken from downstream in the FCC unit prior to the inlet for the ethanolamine unit. The sample gasoline contained a trace amount of mercaptans, which are detrimental to the gasoline. Conventionally, these sulfur species are removed using an ethanolamine process. However, the amine solutions remove valuable hydrocarbons from gasoline or diesel fuels along with the sulfur compounds. Removing butane, ethane, and propane, to research Octane Number, except that this test method may not be applicable to fuel and fuel components that are primarily oxygenates.

The sample fuel was tested in a standardized single cylinder, four stroke cycle, variable compression ratio, carbureted, CFR engine run in accordance with a defined set of operating conditions. The octane number scale is defined by the volumetric composition of primary reference fuel blends. The sample fuel knock intensity is compared to that of one or more primary reference fuel blends. The octane number of the primary reference fuel blend that matches the knock intensity of the sample fuel established the Research Octane Number.

Although the octane number scale covers the range from 0 to 120, the test method used herein has a working range for octane numbers of 40-120. Typical commercial fuels produced for automotive spark-ignition engines have an octane range of about 80 to 90. Typical commercial fuels produced for aviation spark-ignition engines have an octane range of about 98 to 102. Testing of gasoline blend stocks or other process stream materials can produce rains at a various levels throughout the motor octane number range.

Using the test method outlined for octane levels of FCC gasoline, data were obtained indicating that PSF FCC gasoline has an octane level greater than 93.0. This determination was validated by the formula:

knocks/second

It was visually observed that no excessive mechanical vibration occurred during the duration of the test of PSF FCC gasoline. This observation was important because of the lubricity characteristics of the fuel sample PSF.

Most recent historical data regarding oxygenates present in gasoline indicate that this type of gasoline will lower a car's fuel economy by 2% to 3% because oxygenates contain less energy to burn than conventional gasoline.

Standard Test Method for Lead in Gasoline by Atomic Absorption Spectroscopy

This test covered the determination of total lead content of gasoline within the concentration range of 0.010 to 0.10 g of lead/U.S. gallon (2.5 to 25 mg/L). This test method compensates for variations in gasoline composition and is independent of lead alkyl type.

Standard Test Method for Manganese in Gasoline by Atomic Absorption Spectroscopy This test covered the determination of total manganese content of gasoline within the concentration range of 0.001 to 0.120 g of manganese/U.S. gallon (0.25 to 30 mg/L). This test method is not applicable to gasoline containing highly cracked materials (greater than 20 bromine numbers).

Standard Test Method for Phosphorus in Gasoline

This test covered the determination of phosphorus generally present as pentavalent phosphate esters or salts, or both, in gasoline. This test method determines the amount of phosphorus in gasoline in a range of from 0.2 to 40 mg P/liter or 0.0008 to 0.15 g P/U.S. gallon.

Standard Test Method for Sulfur in Petroleum Products by Wavelength Depressive X-Ray Fluorescence Spectrometry This test covered the determination of total sulfur in liquid petroleum products and in solid petroleum products that can be liquefied with moderate heating or dissolved in a suitable organic solvent. The applicable concentration range varies to some extent with the instrumentation used and the nature of the sample. Optimum conditions allow direct determination of sulfur in essentially paraffinic samples at a a concentrations exceeding 0.0010 mass %.

Methanol containing fuels M-85 and M-100 may be analyzed with an accompanying loss of sensitivity and precision because of the more absorbing matrix caused by the high oxygen content of these fuels. M-85 is 85% methanol, 15% gasoline, and M-100 is 100% methanol. Correction factors are applied to obtain concentrations of sulfur compounds. This test method also covers the determine of sulfur in crude oil. Preferred units are mass percent sulfur.

The sulfur species tested were those found to be corrosive or a detriment to the combustibility process of the reformulated gasoline.

Results

All of the above elements tested in PSF were found to be non-detectable or in lower amounts than in the FCC gasoline.

The exception to these tests were sulfur species were which found not to be detrimental to the gasoline.

Standard Test Method of Oxidation Stability of Gasoline (Induction Period Method)

This test determined the stability of gasoline in finished form only, under accelerated oxidation conditions. Tests conducted for oxidation stability determined that the shelf life of the PSF gasoline exceeded the time threshold of 240 minutes (four hours), the real time comparisons of 14 days in underground storage. No measured separation of the PSF gasoline occurred during this test. Furthermore, the octane levels of the PSF gasoline did not degrade with respect to time.

Standard Test Method for Determination of Oxygenates in Gasoline by Gas Chromatography and Oxygen Selective Flame Ionization Detection This test involved a gas chromatographic procedure for quantitatively determining organic oxygenates in gasoline having a final boiling point not greater than 220° C. and oxygenates having a boiling point limit of 130° C. This test is applicable when oxygenates are present in the range of 0.1 to 20 mass %.

The test indicated that no oxygen was present in the various structures of the PSF gasoline. To investigate this further, a second test was performed on the same sample, which again showed that oxygen was not present. The same sample set was also reviewed for any and all oxygenates, i.e., TAME, MTBE, ETBE, etc.), and these compounds were all non-detectable.

Guidelines for Lubricity of Diesel Fuels

Fuels having a SLBOCLE (scuffing load ball cylinder test) lubricity value below 2000 grams will in all probability cause excessive wear in injection equipment, while fuels with values above 3100 grams should provide sufficient lubricity in all cases. If HFFR, values above 600 microns can cause excessive wear, while values below 450 microns should protect injection equipment in all cases. More accurately, an industry-accepted long-term durability pump can be used to evaluate the lubricity of diesel fuel. A poor result in such a test indicates that the fuel has low lubricity and can cause excessive wear.

The course of this test on the various samples did not measure metal wear exceeding 390 microns. The initial data point was achieved testing sales gasoline from the pump. This data point failed within nine minutes using a reciprocating arm to exert the friction required for the test.

None of the conventional gasolines passed the test. However, the PSF samples using the same type of reciprocating arm to exert the same friction lasted for 74 minutes and never failed.

It has been established that the boiling point of PSF is 400° F.; regular gasoline has a boiling point of 100° F. It is believed that as gasoline enters the combustion chamber under compression, the actual residence time with respect to ignition is elongated. This effect increases the life of the gasoline under combustion. With more residence time the gasoline burns longer and cleaner, which reduces emissions from the engine.

Heavy naphthenic crude oils have a low light oil base when separated in the distillation process. To create additional light fuels, heavy oils are reprocessed in the alkylation, isomerization, cracking, and hydro-re-forming process. During these stages undesirable products are formed. However, by adding a compound of the present invention into the distillation system, through steam injection, hydrogen cracking is created and the desired compounds are formed without the requirement for additional heat and pressure over a conventional distillation system.

With a compound of the present invention such as MSS-58 present during distillation, there is minimal formation of olefins, aromatic solvents, and alkynes under heat. There is also prevention of low boiling point hydrocarbon structures volatilizing. The chemical reasoning is that the compounds have a polar kinetic charge which inhibits hydrogen placement and structure formation in hydrocarbons wheel displacing sulfurs. Nitrates are used to activate a nitration reaction. The large amount of hydrogen in these compounds creates readily available hydrogen for use in producing hydrocarbons.

Alkylation and Thermal Cracking

The compounds of the present invention can also be used in alkylation and cracking as well as reforming. In alkylation, HCl+magnesium aluminum silicate+MSS-58 is a perfect combination for reforming and desulfurizing hydrocarbons. With MSS-58 present, less pressure and heat are required, which prevents formation of unwanted aromatic hydrocarbons. No remodeling of conventional thermal cracking apparatus is needed to introduce the new mix.

In thermal cracking, the same process is used with less heat and less pressure by introducing MSS-58 to the acid or gases prior to injection.

All of these process changes are accomplished with minimal or no structural changes, with greater yield, little or no byproduct, and a considerably better end product.

Enhanced Oil Recovery

Oil recovery and natural gas recovery can be greatly enhanced from oil and natural gas wells using an injection tool and a compound of the present invention. This process uses cavitational waves and to achieve optimal penetration throughout the production zone. Cavitation is created by accelerating a fluid stream of compound of this invention through a restricted area, creating a reduction in pressure. The molecules of the liquid in the low pressure zone are literally pulled apart by force and changed into gas bubbles.

Downstream, the fluid undergoes a deceleration process, resulting in a reversal of the energy and raising the pressure above the vapor stage. The bubbles cannot exist at the increased pressure, and are forced to collapse or implode. These implosions are the most effective part of the cavitation process and cause increased penetration of the catalyst. This action reduces the interfacial tension of the well, improves permeability, and enhances recovery from the well.

Cleaning Contaminated Soils

Soil washing is a process used to remediate contaminated soil using specialized equipment, chemicals, and water. Soils contaminated with hydrocarbons, heavy metals or hazardous wastes, such as polychlorinated biphenyls, are introduced into a washing system. Usually the soil is screened prior to being sent to a washing vat chamber to remove large particles. In the washing vat chamber, contaminants are separated from the sediment and liquid. Some systems then treat each contaminant separately, and dispose of the water solution using a waste water system. Contaminated fines may be disposed off-site.

Soil washing can be used either as a stand-alone technology or in combination with other treatment technologies. It can be cost-effective as a pre-processing step in reducing the quantity of material to be processed by another technology such as thermal treating or solidification/stabilization.

According to the present invention, contaminated soils are cleaned with MSS-58, which remediates the contaminated soil at the point where the contaminant and the soil interface by causing a separation of the contaminant from the soil. The compounds of the present invention are effective because they considerably reduce interfacial surface tension. This permits successful recapture of any petroleum products found in the soil.

MSS-58 can be used to remove a variety of chemical contaminants from soils using conventional soil washing applications with the addition of MSS-58. Removal efficiencies depend upon the type of contaminant as well as the type of soil. Volatile organic contaminants are good candidates for soil washing with MSS-58, with about 90-99 percent efficiency.

Tank Bottom Cleaning

Sludge or tank bottom cleaning can be improved by adding MSS-58. Using steamers, nozzles, or other mechanical methods, MSS-58 can be injected along with the water and cause the hydrocarbons to separate for recycling at the refinery.

Because MSS-58 can withstand high temperatures, it is ideal for use in thermal remediation. As the asphaltenes in the tank bottom are heated and separated, they can be removed by mechanical methods prior to cooling. Paraffins separate more easily from the other solids, and the hydrocarbons can be reclaimed because the MSS-58 does not mix with the hydrocarbons.

Compounds of the present invention can be directly injected into a tank as an aqueous solution and, over a period of time, causes a separation of the hydrocarbons from the tank bottom.

Hard Surface Cleaning

While hard surface cleaning can take many forms, the present invention is particularly directed, but not limited, to degreasing materials and parts in manufacturing operations, as well as in cleaning food processing production systems, industrial equipment, vehicles, rail cars, and ships. The compounds of the present invention are effective substitutes for solvents, harsh acids, or harsh alkalies conventionally used for cleaning hard surfaces. The compounds function as a wetting agent plus a surface active agent plus a separating agent for oils and water (i.e., emulsion breakers), processing lines which are covered with grease, oil, or other types of fat are quickly and effectively cleaned. The compounds of the present invention are very effective in cleaning industrial equipment coated with hydrocarbons, such as diesel fuel, asphalt, and similar materials. These compounds can be used as well to wash the interiors of rail cars, trailers and ships which are coated with hydrocarbons, dirt, and grime, and which are sometimes troubled with strong odors from the previous load.

The compounds of the present invention can be applied with high temperature steam cleaners. This method is especially helpful when washing industrial equipment or vehicles. Of course, the compounds can also be applied manually in washing a surface or a process line.

Enhanced Oil Recovery

In most oil fields, only a fraction of the oil can be produced by natural reservoir pressure and by conventional methods such as pumping. Often, as much as 75 percent of the oil can remain in a reservoir after primary recovery. The remaining, or residual, oil can be recovered only by using recovery methods that restore pressure and fluid flow in underground formations by introducing water, gas, chemicals, heat, or a combination thereof, into the reservoir. These recovery methods are often referred to as enhanced or improved recovery methods. A further distinction is made between secondary recovery methods, which often refers to pressure maintenance methods, and tertiary recovery methods, which often refers to methods that improve oil displacement.

The primary methods for enhanced oil recovery are waterflooding, gas injection, chemical flooding, and thermal recovery. Gas injection may be immiscible or miscible. Waterflooding, the most widely used recovery method, and immiscible gas injection are pressure maintenance methods and are generally used in secondary recovery. Thermal recovery lowers the viscosity of the oil and increases its flow rate by introducing heat into the reservoir.

The compounds of the present invention can be used to enhance the performance of all standard methods of enhanced oil recovery. The sodium moiety in the compounds of the present invention acts as a caustic. The silicon moiety in the compounds acts as a surfactant. The combination of caustic and surfactant increases production. Although caustic and surfactant can be used alone, research and experience have shown a synergistic effect when the two are used together. Caustics react with the natural organic acids present in crude oils to form surfactants. Surfactants reduce the interfacial tension between water and oil and break up and emulsify the oil so that it can be moved out of the pores of the formation. The caustics further change wettability both in oil-wet reservoirs and in water-wet reservoirs, thus causing more flow of oil. An aqueous solution of a compound of the present invention coats the oil droplets with a film, giving the oil a constant negative polarity. The compounds of the present invention interact with oil that has adhered to the formation over the years, changing its surface tension, and breaking the oil into small droplets that can be removed from rock pores simply by water drive.

The compounds of the present invention can be used in combination with hot water or hot oil, or by slow feed introduction of aqueous solutions of the compounds alone. Because each well is different, it is essential to analyze the well characteristics, including formation, depth, prior chemical use, etc., to determine the proper treatment protocol. Knowing the mechanism by which compounds of the present invention enhance oil recovery, one skilled in the art can, without undue experimentation, readily determine which method for oil recovery with compounds of the present invention is appropriate for each well.

Treating Sour Gas

Sour gas is treated with compounds of the present invention to remove both hydrogen sulfide and carbon dioxide. A diagnostic module is incorporated in the apparatus so that the gas treating system can be continually adjusted to conform to the composition of the gas and, most importantly, to adjust to changes in the gas compositions. The diagnostic module used addresses every change in the flow of sour gas percentages of contamination of both hydrogen sulfide and carbon dioxide, and reformulates the treating solution to accurately and efficiently remove or reduce hydrogen sulfide and carbon dioxide in the gas to meet customer and/or environmental standards.

According to the present invention, the sour gas is tested to determine the proper and balanced solution, and the diagnostic module is programmed to handle and properly mix the solution which is optimal for that particular sour gas stream.

A conventional alkanolamine unit is used to treat the gas with the new solution. The diagnostic module has access to a series of nine different solutions so that the proper solution can be delivered on a continuous basis to treat the particular gas contaminants. In the event that the levels of hydrogen sulfide and carbon dioxide change in the gas stream, the diagnostic module automatically makes corrections needed and modifies the existing treatment solution in the alkanolamine plant to properly and efficiently continue to treat the sour gas stream.

The base product of the solvents used is at least one compound of the present invention. Differing percentages of additives, including amines such as monodiethanolamine, diethanolamine, monoethanolamine, diisopropanolamine, triethanolamine, are blended to make the solvents.

Basically, the solvents are Silamines which include at least one of the compounds of the present invention. Use of these solvents in treating sour gas has been found to provide capital savings on new equipment or provide a capacity increase with existing equipment. Also, operational problems such as corrosion can be substantially reduced. However, using a Silamine solvent requires that the solvents be properly used and maintained in order to avoid problems that can negate the benefits of a performance solvent.

The differences among the total acid gas removal capabilities of the silamine solvent, are due to the different rates of reaction between the acid gases and the silamine solvent. The silamine solvents are mixed formulations with a base chemical which is a compound according to the present invention, i.e., MSS-58. The compounds of the present invention make it possible to modify the formulations and ultimately tailor the formulations to satisfy the acid gas removing requirements for a variety of hydrocarbons.

Among the silamine treating solvents are the following:
1. 40-60% by weight of MSS-58 blended with 50% monodiethanolamine
2. 40-60% of MSS-58 blended with 46% monodiethanolamine and 3% DEEP
3. 40-60% of MSS-58 blended with 44% monodiethanolamine and 8% diisopropanolamine
4. 40-60% of MSS-58 blended with 42% of monodiethanolamine and 3% diethanolamine
5. 40-60% of MSS-58 blended with 45% monodiethanolamine and 3% diethanolamine
6. 40-60% of MSS-58 blended with 50% diethanolamine
7. 40-60% MSS-58 blended with 42% monodiethanolamine and 2% triethanolamine
8. 40-60% of MSS-58 blended with 45% monodiethanolamine and 20% monomethylethanolamine
9. 40-60% MSS-58 blended with 35% monodiethanolamine and 15% of monomethylethanolamine The silamine treating solvent benefits process outlet gas separators because the solvents reject hydrocarbon adsorption, which promotes solution carryover into the outlet process pipeline. Whereas current technologies allow for a maximum acid gas loading to 0.45-0.50 mole per mole of acid gas comprising hydrogen sulfide, carbon dioxide, carbon oxysulfide, and mercaptans, silamine solvents make it possible to achieve a loading of 0.71 mole per mole of acid gas. This makes more available pound moles to remove more acid gas from hydrocarbons.

Many of the problems common to amine unit operation can be minimized and avoided by installing equipment that will reduce the amount of contaminants entering the system, remove contaminants from the system, reduce amine losses, and reduce the potential for corrosion. Specifically, five pieces of equipment that should be incorporated into an amine unit, are:
Inlet separator
Treated gas knockout/coalescer
Flash tank separator
Particulate filter
Carbon purifier Inlet Separator Sour gas can contain a variety of contaminants such as solids, down-hole or pipeline treating chemicals liquid slugs caused by volume surges or line pigging, compressor lubricants, and, in refining applications, large amounts of sponge oil and acid contaminants. These contaminants promote foaming and can hinder and even shut down operations if allowed to enter the system. These contaminants can be eliminated from the sour gas by a proper inlet separator.

The design of the inlet separator depends on the type of gas being treated and the level of expected contaminants. However, most are gas-liquid separators equipped with an impingement baffle and coalescing device. In refining applications, consideration should be given to a combination separator/water gas for removal of both hydrocarbons and acid impurities that are generated in upstream processing.

Outlet Gas Knockout and Coalescer

The outlet gas knockout is located downstream of the absorber. It serves to minimize controllable solvent losses due to entrainment. However, its main function is to protect downstream processes and minimize solvent loss from uncontrollable carryover that is usually caused by mechanical malfunctions or foaming.

Design considerations should include proper sizing for liquid slug handling capacity, along with a coalescing element to remove entrained mist. The liquid dump valve should be properly sized for withdrawal of large amounts of solvent that result from foaming or upsets.

When treating a liquid hydrocarbon stream, it is advisable to install a coalescer downstream of the liquid/liquid contractor. This vessel allows additional time for separation of amine and hydrocarbon, and serves to recover amine during upset conditions. A coalescer is a horizontal vessel usually having a 3:1 length:diameter ratio. Residence time is generally about 10-30 minutes. A coalescing element is located between the hydrocarbon inlet and outlet.

Flash Tank Separator

A flash tank separator is located on the rich amine stream upstream of the lean/rich exchanges. It serves three purposes: degassing of volatile, dissolved hydrocarbons; separation of heavier liquid hydrocarbon; and vaporization of a portion of the acid gas in solution. This vessel is important because it prevents hydrocarbons from entering the regenerator where they can cause foaming or cause problems in the processing of the acid gas stream. Also, the volatile hydrocarbons can be collected and used as fuel.

The design of the flash tank separator must take into consideration residence time, velocity, and quiescence. Liquid residence time varies between about 10 and 30 minutes, depending upon the amount of hydrocarbon disengagement required. Design should include a settling arrangement and drain for removing liquid hydrocarbons.

Particulate Filter

Particulate filtration is essential for maintaining good solution quality. Solids in the amine solution can cause foaming, fouling, an plugging, resulting in high amine losses, erosion/corrosion, and damage to the absorber and regenerator internals. Solids filters are usually one of three types: cartridge, mechanical, or pre-coat. Cartridge filters are the most popular because of ease of change-out and maintenance.

The design and location of the particulate filter depends on the filtration requirements of the sour gas being treated. The filter can be full flow or slipstream, and can be located on both the lean and rich sides. With the silamine solvents, filtration requirements are usually less than with conventional amine solvents because of low corrosion, resulting in less iron sulfide particulates.

Solution filtration requirements depend on the micron size and quantity of the particulates. Generally, 10 micron filters are used with about a 20-30 micron size suitable for particulate removal. Particulates in the circulating solution should be kept below about 0.02% by weight. The filter should be equipped with a differential pressure gauge to monitor removal effectiveness, and the filter should be able to separate up to differentials of about 25-35 psig. Above this, the elements could collapse and become ineffective. One skilled in the art can readily determine what type of filter is optimal for this type of sour gas treatment.

Carbon Purification

An active carbon bed will remove surface-active contaminants such as hydrocarbons, compressor oils, pipeline corrosion inhibitors, and well-treating chemicals that promote foaming. Therefore, a carbon bed is recommended because of its ability to indirectly reduce amine consumption and the costs associated with plant shutdowns along with good process control.

The carbon bed should be designed to treat a 5-10% slipstream of the cool lean amine stream. On small systems, the carbon bed can be full flow. A 20-minute contact time between amine solution and activated carbon is recommended. Superficial velocity should be about two gallons per minute per square foot of cross-sectional area. A length:diameter ratio of about 4:1 is recommended for the carbon tower.

Amine Unit Operation with Solvents

Before any consideration can be given to amine unit operation, the correct solvent must be chosen to meet the desired process requirements in order to provide the most efficient operation. Once the proper solvent has been chosen, a good understanding of operating guidelines can be realized.

Choosing the Correct Solvent

Most processing requirements differ with each individual application. Consequently commodity solvents are limited in their ability to operate efficiently, as they cannot be tailored to fit a specific application. Often, operational inefficiencies and problems result when attempts are made to use a solvent in an application not suited to its properties.

Silamine solvents of the present invention are specifically designed to fit each individual application. Consequently, the desired processing requirements can be met in the most efficient manner. Selection of the proper solvent is achieved by computer modeling of the specific process conditions and requirements.

Operating Guidelines

Because of the unique differences in properties between silamine solvent vs. commercially available solvents such as MEA, DEA, or DGA, there are also differences in operating practices. Among the considerations are solvent concentration, lean solvent temperature, circulation rate, regenerator conditions, and reboiler conditions.

Solvent Concentration

The silamine solvents operate most efficiently at a 50 weight % concentration, + or −5 weight %. MEA concentration is currently limited to 15-20 weight %, and DEA is currently limited to 30 weight % concentration because of corrosion problems. Therefore, substantially more capacity exists with the 50 weight % silamine concentration vs. MEA or DEA, even when the lower molecular weight of MEA is considered. Consequently, conversion to a silamine solvent can create additional processing capacity or reduced energy requirements due to a lower circulation rate. Furthermore, at the 50 weight % concentration, equilibrium rich acid gas loadings are lower with the performance solvents versus commodity amines. Consequently, the potential for corrosion in the rich solvent areas of the plant is reduced. Moreover, the lower heat of reaction associated with the silamine solvents will produce lower rich solution temperatures, which further reduces the potential for corrosion.

Operating above the 50 weight % concentration can lead to viscosity related problems, such as inefficient acid gas absorption, increased hydrocarbon entrainment, poor heat transfer, and higher pumping requirements. Operating below the recommended concentration will result in increased circulation rate and higher reboiler duties. Also, in selective application, carbon dioxide rejection is decreased with the higher circulation rate and extra gas/liquid contact time.

Lean Solvent Temperature

The proper lean solvent temperature to the absorber depends on the type of gas treating application and the particular silamine solvent used. In all applications, the lean solvent should be about 10° F. hotter than the feed gas, especially when the feed gas contains more than 2% ethane or heavier hydrocarbons. This is important to avoid condensing hydrocarbons in the amine solution, which can cause foaming. In all gas/liquid treating application, lean temperature should be maintained below about 130° F., as operating temperatures above that can result in increased circulation rate of off-spec product.

In selective applications, the lean temperature should be kept as low as possible to maximize rejection of carbon dioxide, but not below about 80° F., as viscosity related problems may occur. Because of vapor-liquid equilibrium considerations, hydrogen sulfide removal is increased with lower lean amine temperatures. Also, with the lower lean temperature, carbon dioxide absorption kinetics are decreased. Consequently, circulation rate is minimized, while carbon dioxide rejection is maximized.

In carbon dioxide removal applications with performance solvents, the lean temperature should be maintained between about 100° and 130° F., depending on the feed gas temperature and hydrocarbon content. Below about 100° F., carbon dioxide absorption kinetics are hindered. The hotter the lean solvent, the higher the circulation rate requirements because of vapor-liquid equilibrium considerations.

When treating liquid hydrocarbon streams, it is recommended to increase the lean solvent temperature to about 130°-145° F., provided the hydrocarbon would not vaporize at these conditions. This increased temperature will decrease the viscosity of the silamine solvent and result in better amine/hydrocarbon separation in the contractor. Amine entrainment and solvent losses will then be kept to a minimum.

Circulation Rate

With silamine solvents, a process evaluation is performed which specifies the design solvent circulation rate based on the design operating conditions. If actual operating conditions differ from the design conditions, the following formula can be used to approximate the required circulation rate:

Required circulation rate(GPM)=(design GPM rate)×(Actual % $H_2S$)(actual % $CO_2$)(actual MMSCFD)(desired weight % solvent) (Desired % $H_2S$)(desired % $CO_2$)(desired MMSCFD)(actual wt % solvent)

If a substantial difference exists, another process evaluation should be performed.

It is important to maintain the circulation rate as close to design as possible. Usually the tendency is to over-circulate the solvent. When this occurs, needless energy is wasted in the reboiler because of increased sensible heat requirement and in electricity to drive the pumps. Furthermore, solvent over-circulation can result in poor solvent regeneration, inability to make specifications, corrosion, reduced selectivity, and solvent losses. If the solvent is under-circulated, high rich acid gas loading and corrosion can result, along with off-spec product gas. To keep the circulation rate optimized, a target rich loading should be established and analyzed routinely. Adjustments can be made according to the results of the rich solvent analysis.

Circulation rate is an important variable when operating with a silamine solvent. By changing the circulation rate, selectivity can be altered to meet the desired process conditions with the selective performance solvents. One alternative to varying circulation rate to achieve the desired selectivity is to equip the absorber with multiple lean solvent feed points. This will reduce or increase the amount of absorber staging and decrease or increase the gas/liquid contact time, which in turn will increase or decrease selectivity. Operating options with the primary and secondary amines (MEA and DEA) are limited, as these amines are nonselective, and both carbon dioxide and hydrogen sulfide are adsorbed regardless of gas/liquid contact time.

Regeneration Conditions

Substantial energy savings and reboiler capacity results with an optimized silamine solvent as compared to a conventional amine. For example, typical MEA regeneration requirements are 1.5 lbs steam/gallon circulation; DEA usually requires about 1.0 lb steam/gallon circulation. Regeneration requirements for a performance amine according to the present invention can be as low as 0.7 lb steam/gallon of circulation. The main reason for this lower energy requirement is the lower heat of reaction associated with the silamine solvents. Therefore, the acid gas is readily stripped from solution with less heat input than with an MDEA-based solvent. This is evidenced in what is a normal lean loading for MEA, DEA, and a silamine performance solvent:

| Solvent | Lean Loading, m/m |
|---|---|
| MEA | 0.5-1 |
| DEA | 0.03 |
| Silamine | 0.005 |

In addition to the energy savings that result from this ease of stripping, the corrosive effects of the lower residual acid gas on the hot lean areas of the plant are substantially reduced. The regenerator options and reboiler can be easily controlled and optimized if the regenerator overhead temperature and pressure are available, since this is an indication of the amount of stripping steam being generated in the reboiler.

The temperature and pressure are measured at the top of the regeneration, upstream of the reflux condenser. The reflux ratio-lb. mole $H_2O$/lb mole acid gas is defined as "the ratio in moles of water returned to the regenerator per mole of acid gas leaving the reflux accumulator." Optimized reflux ratios of about 0.85:1 to about 1.25:1 are recommended for regeneration of most silamine solvents. In contrast thereto, MEA and DEA usually require reflux ratios of 2:1 to 4:1. Once the desired conditions are met, the lean acid gas loading should be determined and heat input adjusted to achieve the required lean loading. At this time, a steam/circulation value can be determined for unit operators to follow.

Reboiler Conditions

Operations of the reboiler should not require any special attention except for varying steam input to achieve the correct overhead temperature as mentioned above. The reboiler temperature is very insensitive to the heat input and should not be used to control the regenerator operations. Typically, a 50 weight % silamine solvent at 12 psig will boil at about 252° F. It is important that the solution be at its boiling point to ensure that the solution be regenerated. To protect against thermal decomposition, a maximum tube skin temperature of about 320° F. and a bulk solution temperature of about 280° F. should not be exceeded. Heat flux in the reboiler should be below about 7000 Btu/hr/sq ft.

Solution Monitoring and Control

It is important to monitor the solution and conduct proper maintenance when using a silamine solvent to keep operations trouble-free, minimize costs, and consistently achieve the benefits the solvent can provide. To keep the solvent in the proper condition, the following quality factors should be monitored and controlled:

Solvent concentration
Acid gas loadings
Contaminants
Foaming tendency

Solvent Concentration

Solvent concentration should be analyzed daily. As mentioned above, solvent circulation rate is directly affected by amine concentration for a given set of conditions. This analysis is quick, and requires only simple equipment.

Acid Gas Loading

The lean and rich acid gas loadings, usually expressed as moles of acid gas per mole of solvent (m/m), are important because of the insight they provide into absorber and regenerator performance and overall solvent utilization. A typical lean solvent loading with a silamine solvent is 0.05-0.2 m/m. A significantly higher lean loading is indicative of improper regenerator operation or a mechanical problem in the regenerator. Continued operation under these conditions could cause acid gas corrosion in the regenerator or reboiler in addition to off-spec. operation. Lean loadings below these levels are an indication of over-stripping and excess energy consumption.

Rich solvent loadings depend on many factors, and can provide insight into unit operations. Computer modeling of the system operating parameters with the silamine solvent will determine an optimized rich loading. Analysis of the rich solution will then provide insight into unit optimization by comparing the actual rich loading to the optimized loading. If the rich loading is too low, either circulation rate can be reduced, followed by a reduction in reboiler duty, or a problem exists in the absorber that hinders acid gas absorption. If the loading is too high, the circulation rate should be increased to avoid corrosion caused by flashing of acid gas from the rich solution in the heat exchanges.

Contaminants

Solvent contaminants can enter the system via the feed, makeup water, or can be formed by thermal or chemical degradation of the amine. Contaminants common to the amine system include heat-stable amine salts, makeup water impurities, and thermal and chemical degradation compounds.

Of all the amines used in gas treating, including the performance amines, only MEA, DEA and sulfinol can be thermally reclaimed at atmospheric pressure because of their low boiling points. However, use of a reclaimer can result in high solvent losses and high energy requirements. With the silamine amines, certain types of solvent contaminant can be removed via on-line separation. Also, the tertiary amine-based silamine amines are much more resistant to chemical degradation. All types of solution contaminants can result in operational problems such as corrosion or high costs. The contaminant should be monitored and their accumulation minimized.

Heat-Stable Amine Salts

Heat-stable amine salts are created by the reaction between the amine and highly acidic contaminants that enter with the feed. These salts are called heat-stable because they cannot be thermally regenerated under normal stripper temperatures. They will form regardless of amine type and can cause problems such as corrosion and foaming. Also, they reduce the acid gas capacity of the solvent by rendering a portion of the amine inactive. The types of acid anions that form heat-stable amine salts can be analyzed by ion chromatography. Total heat-stable amine content can be determined by a simple titration method.

Depending upon the type and quantity of acids present and the particular system, the content of heat-stable amine salts should not exceed about 10% of the active amine concentration. The silamine technology has been developed for on-line removal of these salts. As a result, the high solvent usage and corrosion associated with these salts is substantially reduced. However, for feed containing a large amount of acid contaminants, water washing is recommended for removal of these contaminants before they contaminate the amine solvent.

Oil Recovery from Tar Sands

There are abundant sources of oil in muskeg, rock, sand, and clay. These deposits are known generally as tar sands, as a result of the sticky, tarlike appearance of the oil embedded in the sand. The oil recovered from tar sands is called bitumen.

Tar sands are extracted using strip mining, hot water extraction, of various in-situ heat processes. Dr. Carl Clark developed the hot water extraction process in 1921. Syncrude Oil Company still uses this process in Canada. The "Clark Hot Water Process" uses hot water, sodium hydroxide, and naphtha. Unfortunately, this process has created, and continues to create, one of the largest environmental problems facing Canada.

There are three major problems with the Clark Hot Water Process. First, sodium hydroxide itself is a hazardous product, and its use makes it nearly impossible to separate water cleanly from the bitumen. Second, the middle layer of the tailing ponds forms a sodium silicate salt caused by the reaction of the sodium hydroxide with the bitumen and clays. This sodium silicate salt is very damaging to fish and other wildlife. Third, a naphthenic acid, derived by the fraction of bitumen with sodium hydroxide and subsequent acidification, remains on top of the tailing ponds to be evaporated into the atmosphere, where it forms acid rain.

One process involves strip mining the tar sands, in which the sands are excavated with huge draglines, giant shovels, and trucks onto a 25 mile long conveyor system that takes the tar sands to the refinery for extraction and upgrading. At the extraction facilities, the bitumen is extracted from the tar sands by mixing hot water, steam, and sodium hydroxide with the tar sands in a rotary kiln. The bitumen is removed as a froth in collector vessels for primary separation. A second process to remove fine solids and water is achieved by diluting the froth with naphtha and finally running the mixture through a centrifuge. Most of the naphtha is reclaimed for reuse. The residue, called tailings, consisting of a mixture of bitumen, sand, clays, water and naphtha, is pumped to a tailings pond.

The process of the present invention for extracting bitumen from tar sands uses compounds of the present invention rather than sodium hydroxide, and a soil washing process at the place of extraction. By moving the location of the extraction process, the cost of transporting the extracted material, which is about 90% soil and only about 10% bitumen, is substantially reduced. The cost of moving the soil using the conventional system is approximately 53% of the total cost of extraction. Also, by extracting and soil washing at the mining site, approximately 38 million gallons of water can be saved daily.

Most importantly for the environment, bitumen extraction according to the present invention eliminates the use of caustic soda and naphtha, thus avoiding the creation of highly contaminated and environmentally destructive tailing ponds. These tailing ponds are actually good-size lakes, and are very toxic to humans and other animals, including birds and fish.

Tar sands recovery can be even more easily accomplished by in situ methods. Here, the compounds of the present invention are pumped directly into the tar sands. Because the specific gravity of the bitumen is lower than that of the soil, and because the compounds of the present invention reduce the interfacial tension between the oil and soil molecules, the bitumen rises to the surface, where it can be skimmed. The result is much less excavation of dirt, which again saves a substantial portion of the production cost.

The compounds of the present invention can also be used to remediate existing tailing ponds and removed bitumen which otherwise is permanently lost.

Removal of Polychlorinated Biphenyls

The compounds of the present invention can be used to treat PCBs. In this process, the PCB molecules are chemically altered by removing the chlorine atoms therefrom. The resulting compounds are safe, non-toxic solids which can be disposed of safely without special precautions. The process is an efficient, relatively inexpensive treatment for PCBs and related chlorinated hydrocarbon substances. The process can operate at a fixed site, or as a mobile unit, moving from site to site. The mobile approach eliminates the need to transport the PCBs, which is a hazardous activity, providing the opportunity for additional exposure to these toxic compounds.

Oil contaminated with PCBs was analyzed for PCBs prior to treatment with compounds of the present invention and after treatment with compounds of the present invention. It was found that the compounds of the present invention successfully lowered very high concentration of PCBs in oils down to non-detectable or nominal levels, depending upon the exact formation of the compounds used. Additionally, the treatment process of the present invention was assayed to determine if any hazardous vapors were emitted during treatment of the PCBs. No hazardous vapors were found to be emitted during the PCB treatment process. Moreover, no hazardous byproducts were generated during the treatment process.

To demonstrate that the compounds of the present invention can eliminate PCBs from oils, the following experiment was conducted.

Equal amounts of PCB oil and a fatty acid were added to a two quart plastic container with a screw cap. The cap had three openings to allow for an air intake tube, an air exhaust tube, and a variable speed mixing device (paddle stirrer). A variable speed stirrer was inserted through the cap, and a calibrated air sampling pump was connected to the air exhaust tube. The air sampling pump was equipped with a filter tube containing florosil, the recommended medium for sampling air for PCB analysis. The air sampler was activated and continued running throughout the process. The stirrer was used for approximately 30 seconds to mix thoroughly the PCB oil and the fatty acid.

The container was momentarily opened and MSS-58 was added to the oil mixture. The amount of MSS-58 was equal to half the amount of PCB oil originally used. The cap was closed and the liquids were mixed for approximately 30 seconds.

The container was momentarily opened and solidification powder was added to the liquid mixture. The amount of powder was four times the amount of PCB originally used. The cap was closed and remained closed throughout the remainder of the process. The powder was mixed into the liquid until the liquid was completely solidified, which took approximately three minutes. The air sample remained on for an additional hour and a half.

The air sampler was on for a total of one hour and 38 minutes, at rate of 0.562 liters per minute. A total air volume of 55.1 liters was collected by the sampler. This volume is equivalent to 27 air exchanges of the reaction container.

A portion of the oil was analyzed for PCB content. It was found that the oil contained Arochlor 1260 at a concentration of 86000 mg/kg.

The air filter tube with florosil was analyzed for PCB following NIOSH Method 5503. No PCB was detected in the air filter tube. The detection limit was 0.00002 mg of PCB. For the sample volume collected, this is equivalent to a detection limit of 0.0000004 mg/L of air.

The solidified material in the container was analyzed for PCB content. If no PCB breakdown had occurred, the percentage of PCB in the solid would be expected to be approximately 6 times lower than the percentage of PCB in the oil because of the dilution effects of the solidification process (about 1400 mg/kg). The PCB in the solid was Aroclor 1260, found at a concentration of 370 mg/kg.

The solidified material in the container from the bench scale process was analyzed by solvent extraction and by gas chromatography/mass spectroscopy (GC/MS) for semivolatile organic compounds. This technique allows for separation by the GC instrument and simultaneous "fingerprinting" by the MS detector. The chromatogram showed a pattern of a refined oil present. The MS analysis identified the major components of the pattern as hydrocarbons, which are expected to be present in a transformer oil.

The analysis also identified two compounds consistent with compounds used in transformer oils: trichlorobenzene and tetrachlorobenzene. One of the common uses of these compounds is as an additive to dielectric fluid used in transformer oil. There are two possibilities for the presence of the trichlorobenzene an tetrachlorobenzene in the solidified material. The first is that they were present in the oil and were still present in the solidified material. The second possibility is that they were formed by destruction of the PCB molecules.

Neither trichlorobenzene nor tetrachlorobenzene is on the TCLP list for hazardous constituents. Trichlorobenzene is not a listed waste by the EPA. Tetrachlorobenzene is listed waste on the P list, which contains chemicals that are considered toxic if they are disposed of as a spent product. The level of tetrachlorobenzene found in the solidified material was lower than what would be found in a spent product.

The PCB oil after treatment with MSS-58 had the following composition:

|  | Wt % |
| --- | --- |
| carbon | 42.56 |
| oxygen | 8.56 |
| sodium | 1.63 |
| magnesium | 0.99 |
| silicon | 1.71 |
| chlorine | 2.14 |
| calcium | 42.41 |

These results are significant, because the process of the present invention overcomes the deficiencies associated with incineration, low temperature thermal desorption, biotreatment-treatment, and long term storage of PCBs. For example, in comparison to incineration and thermal desorption, the process of the present invention does not produce toxic air emissions, such as dioxin, and it is less costly than incineration. In comparison to biotreatment-treatment, the process of the present invention has predictable, immediate, and good results, and is not sensitive, temperature sensitive and slow, as is biotreatment-treatment. Finally, in comparison to long term special storage, the process of the present invention is permanent, and the owner's liability for hazardous materials disappears once the process is completed. In contrast thereto, in long term special storage the PCBs simply await treatment by the next generation, while exposing the owner to possible liability so long as the PCBs remain untreated.

Extraction of Edible Oils

Oils have long been removed from seeds, nuts, and other plant matters. The best known types of edible oils include soybean oil, coconut oil, sunflower oil, cottonseed oil, olive oil, palm oil, and peanut oil. Lesser known sources for edible oils include the family of plants that produce essential oils. Essential oils are used in processed foods, pharmaceuticals cosmetics, perfumes, soaps, and in industrial products ranging from animal feeds to insecticides to paints. Essential oils include, among other, cedar oil, citronella oil, jasmine, lemongrass, nutmeg, peppermint, pine spruce, turpentine, and wintergreen.

Edible oils are conventionally extracted by cold mechanical pressing, hot mechanical pressing, and solvent extraction.

Cold pressing for oil recovery goes back to antiquity. High oil content seeds, such as sesame, peanut, and the oily pulp of olives yield free oil simply when pressure is applied. The oil meals, i.e., the residues from which oil has been removed, resulting from cold pressing containing an large amount of valuable oil, making cold pressing not very efficient in extracting oil.

The extruder-expeller extraction processes uses friction, rather than heat, to rupture the oilseeds. Once ruptured, the oilseeds are pressed in an expeller to remove the oil. This process is economical to use, and produces both oil and meal for animal feed.

Solvent extraction recovers most of the oil from seeds. Solvent oil meal contains about 0.5% residual oil. Unfortunately, hexane is the solvent most often used in this method, but hexane is highly ignitable and flammable, and is toxic to humans.

In some cases pressing is combined with solvent extraction. This combination process is called prepress solvent extraction. In this process, the seeds are light screw pressed to reduce the oil by one-half or two-thirds of its original level before solvent extraction completes the job.

In solvent extraction of plant materials such as soybeans, the beans are first flaked and toasted or cooked. Flaking exposes as much of the surface of the bean to the solvent as is possible. Cooking denatures cell tissues so that the solvent can penetrate it more readily. The solvent is then allowed to flow through the bean flakes to extract the oil. The solution of oil in solvent is referred to as the miscella. At this point, the solvent is stripped off by evaporation to yield a crude oil for further processing.

The compounds of the present invention are particularly useful in the extruder-expeller processes. This process is highly favored by smaller processors, as well as companies interested in producing both oil and meal for animal feed. In the extruder-expeller process, the compounds of the present invention increase the oil extraction rate, improve oil cold, reduce friction in the expellers, and save energy costs.

According to the present invention, the compounds of the present invention are added at the beginning of the pressing phase to reduce the interfacial tension between the solids and the oil. This improves the separation and extraction of the oil, and results in a greater extraction rate than when using hexane alone.

Aqueous solutions of the compounds of the present invention can be completely substituted for hexane in the solvent extraction process. Using these compounds rather than hexane reduces safety hazards for workers, and eliminates the pollutants that are created when hexane is used as the extraction chemical.

The compounds of the present invention can be used to extract essential oils as well. Field test extracting of cedar oil proved that it was very beneficial to the extraction rate. It is very important to improve the extraction rate of essential oils, as the plants that produce essential oils produce only very small quantities of the oil. Thus, essential oils are quite expensive, and any process that improves recovery is valuable.

Oil from cottonseed is extracted by mechanical extraction. One mechanical process involves a screw press or expeller. In this process, after the seed is cleaned to remove dirt and other trash, the seed is mechanically delinted to remove the short cellulose linter fibers. Once the linters are removed, the hulls are separated from the seeds. Then the seed is flaked to facilitate oil removal. Moisture is adjusted prior to flaking to assure proper flaking. Typically, the moisture level is too low for proper flaking, so the seeds are conditioned by adding water or steam. After flaking the flakes are cooked in steam jacketed vessels at temperatures ranging from 190° F. to 270° F. Cooking the flakes breaks the cell walls, allowing the oil to escape. However, if the flakes are overcooked, the oil may be abnormally dark in color, and the nutritional value of the meal may be impaired. The flakes are then moved to the screw press, or expeller. Here pressure is applied gradually to the flakes as the screw moves the flakes from the feed end to the discharge end of the expeller barrel. A plug of compressed meal is discharged from the expeller, and a drainage barrel collects the expressed oil.

In another mechanical process, known as the dry extrusion process, both an extruder and an expeller are used. The seed first drops to a shaker to remove dirt and other debris. The seed dos not go through the delinting, flaking or cooking processes, but moves directly into the high shear, closed-wall extruder where friction heats the cottonseed to 240-275° F., which causes the oil cells in the seed to burst. Water is injected into the extruder to assure proper temperature levels. When ejected from the extruder, the seed material is a hot, frothy meal. The meal is then moved by auger to the screw press, where the oil falls out into settling pans and is moved to storage tanks, and the meal is moved to the bulk storage area.

Tests were conducted to determine if the compounds of the present invention improved certain aspects of extraction of cottonseed oil from whole cotton seeds. The tests examined if the compounds increase the amount of oil extracted from the cottonseed, if the compounds increase the amount of protein in the meal after the oil is extracted from the cottonseed, if the compounds of the present invention improve the quality of the oil extracted from the cottonseed, and the best ratio of compounds of the invention to cottonseed to use in the process.

Two separate field tests were conducted a CPE Feed, Inc, Brownfield, Tex. The equipment included a shaker to clean whole cottonseed, two Inst-Pro 2500 extruders, and three Inst-Pro 1500 expellers. Conveyors or augers moved the material from phase to phase. The equipment processes 6000 pounds of whole cottonseed per hour.

In Test #1, a small holding tank that held about 7 gallons of a 1% solution of MSS-58. The MSS-58 was delivered under 60 pounds pressure from the holding tank to two spray nozzles that delivered three gallons of solution to each location. One spray nozzle was located on an auger used to move the cottonseed after it left the shaker to the extruder. The second location was above the cottonseed meal trough prior to entering the cottonseed expellers.

Before the test began, three samples were taken. These samples consisted of:

1. Whole cottonseed from the cotton shaker prior to entering the extruder;
2. Cottonseed oil taken from the first extruder; and
3. Cottonseed meal collected from the first expeller prior to delivery to the bulk storage area. Toward the conclusion of Test #1, three additional samples were taken from the locations were the "before" samples were collected.

In Test #2, the equipment consisted of two holding tanks to hold the MSS-58 solution for continuous flow. The MSS-58 was delivered under 60 pound pressure from the tanks to the contact points via lines and sprayers. Each point of contact delivered three gallons per hour of MSS-58 solution. One contact point was on the whole cottonseed on the conveyor prior to entrance to the extruder. The second contact point was located at the end of the meal trough prior to entering the expellers.

The second test used three different amounts of MSS-58 to determine the most effective amount of MSS-58 to use. The first test used 1% of MSS-58. The second test used 1.5% MSS-58. The third test used 2% MSS-58. Each test was scheduled to run for 48 hours, with samples taken every four hours. Samples were taken from three locations:

1. Whole cottonseed was taken from the cotton shaker prior to entering the extruder;
2. Cottonseed oil was taken and placed into separate containers from each expeller; and
3. Cottonseed meal was collected from the holding barn.

Each time samples were taken, a record was made of the amperage of the extruders and expellers, the RPMs under which the extruders were operating, and the temperature of each extruder. Ten samples were taken with the 1% solution, eleven samples were taken with the 1.5% solution, and ten samples were taken the 2% solution.

All of the samples were tested by Fox Laboratories of Lubbock, Tex. using A.O.C.S. testing protocols. Both the oil and the meal were tested to determine if each met the standards for Prime Crude Cottonseed Oil and for Whole Pressed Cottonseed, Prime Quality.

In Test #1, both the oil and the meal met the NCPA prime quality standards. The oil extracted with the MSS-58 solution showed an improvement in the color and a decrease in refining loss when compared to the oil extracted without MSS-58. The moisture and volatile matter was unchanged, and the free fatty acids were slightly elevated. The meal extracted with MSS-58 shows a reduction in the amount of oil (i.e., MSS-58 caused more oil to be extracted) and an increase in the amount of protein in the meal.

In Test #2, for each amount of MSS-58 used, both the oil and the meal met the NCPA prime quality standards. Overall, the most effective ratio was 1.5% of MSS-58. Test #2 showed results similar to those in Test #1 in the oil and the meal.

The above test showed that MSS-58 increased oil extraction by more than 1%. Additionally, the refined and bleached color of the oil is improved when extracted using MSS-58. MSS-58 also increased the amount of protein in the meal. This factor is very important to growers who use cottonseed meal as a source of protein in the ratio. The increase in protein content of the meal is estimated to be of equal value per ton of meal to the value of the oil extracted.

MSS-58 also caused the equipment to run more efficiently. In the tests, as well as in subsequent use, CPE Feed, Inc., reported a reduction in amperage at both the extruder and the expellers without experiencing a reduction in RPMs. Clearly, this reduces the costs of electricity for the operation.

The following Table illustrates the advantage of using compounds of the present invention in obtaining oilseed meal.

| PRODUCT | TEST NO. 1[1] | | | TEST NO. 2[2] | | | STANDARDS[3] |
|---|---|---|---|---|---|---|---|
| | Without MSS-58 | With MSS-58 | Percent Improvement | Without MSS-58 | With MSS-58 | Percent Improvement | |
| Crude Cottonseed Oil | | | | | | | Rule 146-Prime Crude Cottonseed Oil |
| Free Fatty Acids | 1.80% | 1.90% | (0.947%) | 1.70% | 1.80% | (0.944%) | |
| Refining Loss | 8.90% | 8.60% | 1.035% | 9.80% | 8.40% | 1.167% | <20% |
| Color of Refined Oil | 5.00 | 4.10 | 1.220% | 8.60 | 5.40 | 1.593% | <12 |
| Color of Bleached Oil | 1.80 | 1.00 | 1.800% | 2.40 | 1.60 | 1.500% | |
| Flavor | Prime | Prime | | Prime | Prime | | Prime |
| Moisture $ Volatiles | 0.06% | 0.06% | No Change | No Data | 0.06% | | <1.00% |
| Whole Pressed Cottonseed (cottonseed meal) | | | | | | | Rule 266—Whole Pressed Cottonseed, Prime Quality |
| Moisture | 5.30% | 5.20% | 1.019% | 7.60% | 4.80% | 1.583% | |
| Oil | 5.60% | 5.52% | 1.014% | 5.72% | 5.95% | 1.040% | |
| Protein | 27.40% | 27.70% | 1.011% | 20.83% | 27.50% | 1.320% | >22% |

[1]Test at CPE Feed, Inc., Brownfield, TX, on Nov. 25, 1997. Results reported by Fox Laboratories, Lubbock, TX.
[2]Test at CPE Feed, Inc., Brownfiled, TX on December 16-22, 1997. Results on oil without MSS-58 reported by ADM, Memphis, TN. Results on oil with MSS-58 and meal without and meal with MSS-58 reported by Fox Laboratories, Lubbock, TX. Results are greatest oil results—Test #2 at 1.5%.
[3]National Cottonseed Products Association Trading Rules 1997-1998.

The compounds of the present invention are also used in refining edible oils. In the refining process, the nonglyceride fatty material is first removed. Then the residue of degummed oils is removed by washing the oils with a strongly alkaline solution, such as sodium hydroxide. The compounds of the present invention are ideal substitutes for the hazardous sodium hydroxide, as they completely wash the oils without producing a strongly alkaline residue.

Odor Treating

Odors can sometimes be sufficiently unpleasant to create an environmental hazard. Odor treatment can be required for household purposes as well as for institutions, industrial, and governmental purposes. No matter if the smell comes from used cat litter, the manufacturing plant down the street, the city's wastewater plant, or the not-so-well run nursing home, there is the same demand in each situation, that the smell be removed.

Prior to deodorants, fragrances such as colognes and perfumes were used to mask odors. Churches and other public places burned incense, sometimes merely to cover objectionable odors. Industrial odor counteractants are used to blanket, hide, or counteract unpleasant odors. Some of these unpleasant odors work on an individual's olfactory nerves in such a way as to cause discomfort or even nausea and insomnia.

Although the counteracting approach may work to cover the undesirable odor, unfortunately, the new odor which replaces the first odor may be equally or more offensive. Also, even if the new odor is an improvement over the original odor, the original odor is likely to reoccur as the masking effect dissipates. Thus, the better way to treat odor is to eliminate it rather than masking it.

The compounds of the present invention have been found to destroy odors. Many odors are ensued by growth of bacteria. The high pH of the compounds of the present invention (concentrated solutions are pH about 13.2 to about 13.5) kills the bacteria causing the odor.

The compounds of the present invention are applied in an area where odor is a problem. For example, aqueous solutions of the compounds can be applied directly to a middle school bathroom, a cat litter box, or a gym. The solution is merely misted onto the offending surface. Within a meaningful elapse of time, the odor is gone, and there is no masking odor left in its place.

In one instance, a rancher's dog was the victim of an angry skunk. The owners tried every soap in the house, tomato juice, etc., but the dog still reeked of eau de skunk. They then washed the dog in a dilute solution of the compound of the present invention, which successfully eliminated the odor.

The compounds of the present invention have also been effective in removing odors from a fish pail in which fish had been stored for several days, chicken droppings in a farmyard, and in industrial waste water laced with hydrogen sulfide gas. In each case, the odor was eliminated, and no new odor was left in its place.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus, the expressions "means to . . . " and "means for . . . ", or any method step language, as may be found in the specification above and/or in the claims below, followed by a functional statement, are intended to define and cover whatever structural, physical, chemical, or electrical element or structure, or whatever method step, which may now or in the future exist which carries out the recited functions, whether or not precisely equivalent to the embodiment or embodiments disclosed in the specification above, i.e., other means or steps for carrying out the same function can be used; and it is intended that such expressions be given their broadest interpretation.

What is claimed is:

1. A method for extracting edible or essential oils from plant materials comprising mixing a plant material containing edible or essential oil with an aqueous solution of a metal hydride compound and pressing the plant material to extract the edible or essential oils therefrom, wherein the metal hydride compound is prepared by mixing together from about 1 to about 10 parts by molecular weight of at least one metal selected from the group consisting of silicon, aluminum, tin, and zinc; from about 1 to about 3 parts by molecular weight of an alkali metal hydroxide; and from about 5 to about 10 parts by molecular weight of water and allowing this mixture to stand for a time sufficient to form a metal hydride.

2. The method according to claim 1, wherein the metal hydride compound is $Na_{8.2}Si_{4.4}H_{9.7}O_{17.6}$.

* * * * *